Aug. 24, 1948.   M. MASS   2,447,985
DEVICE FOR DETERMINING PHOTOELECTRICALLY THE
CONCENTRATION OF A SOLUTE IN A SOLVENT
Filed June 25, 1945   4 Sheets-Sheet 1
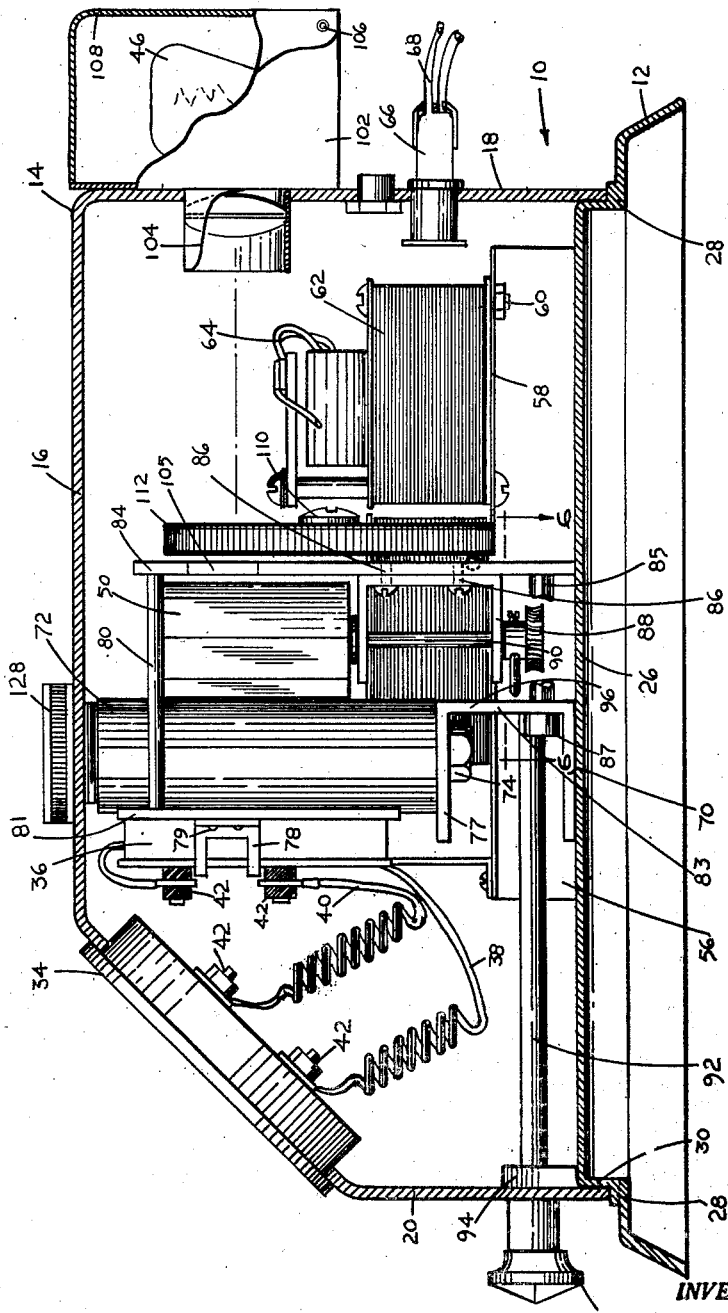
INVENTOR.
MORRIS MASS
BY Irving F. Goodfriend
ATTORNEY

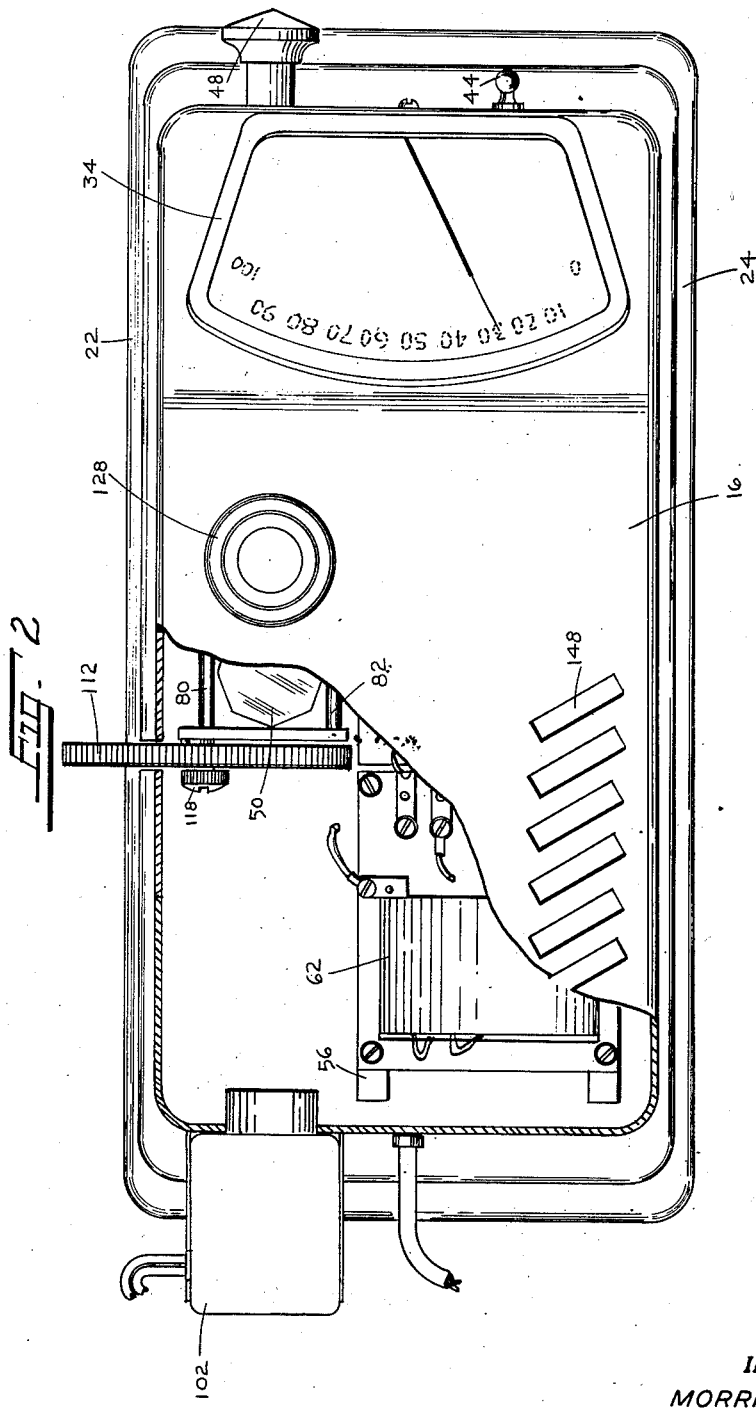

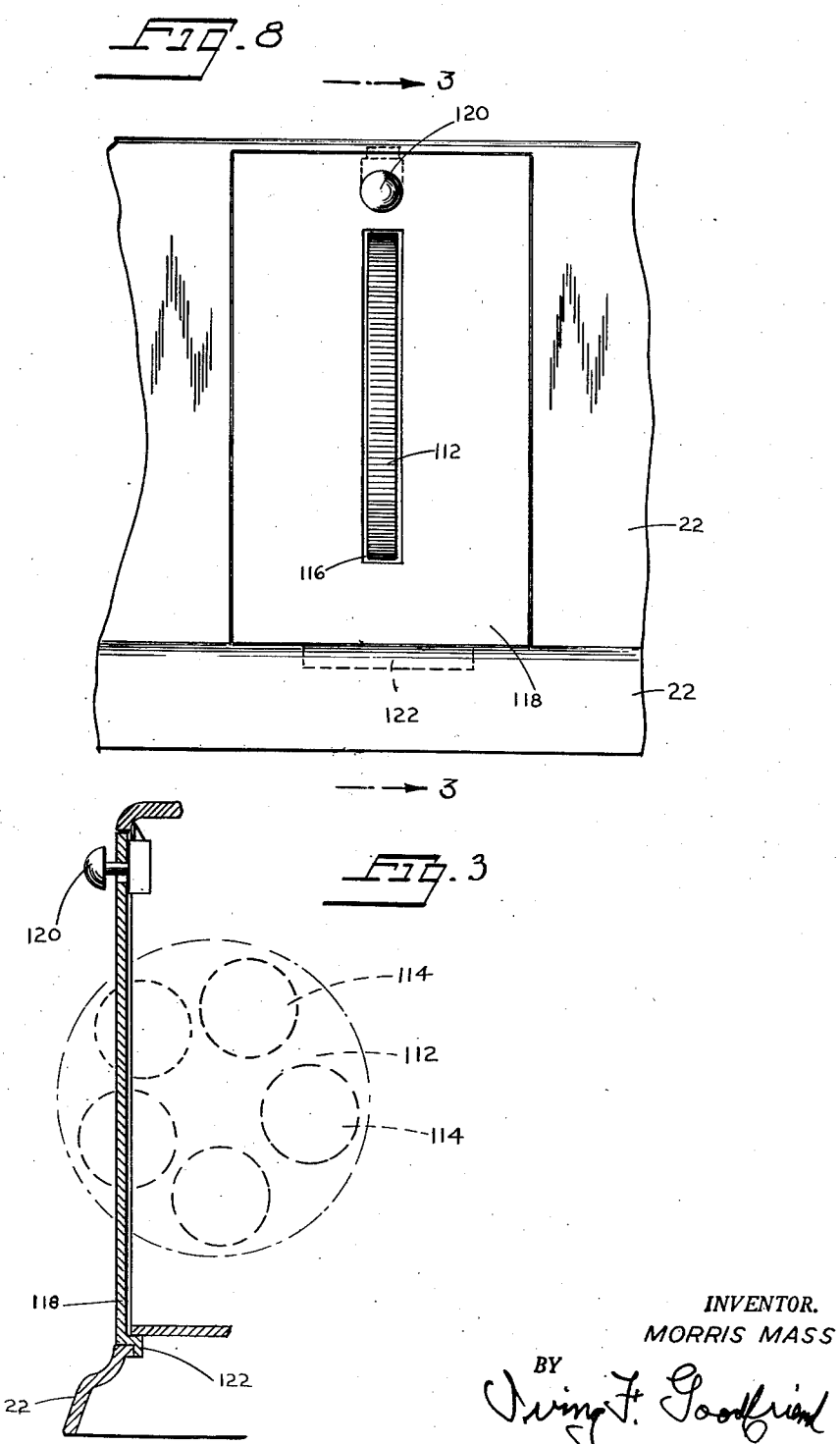

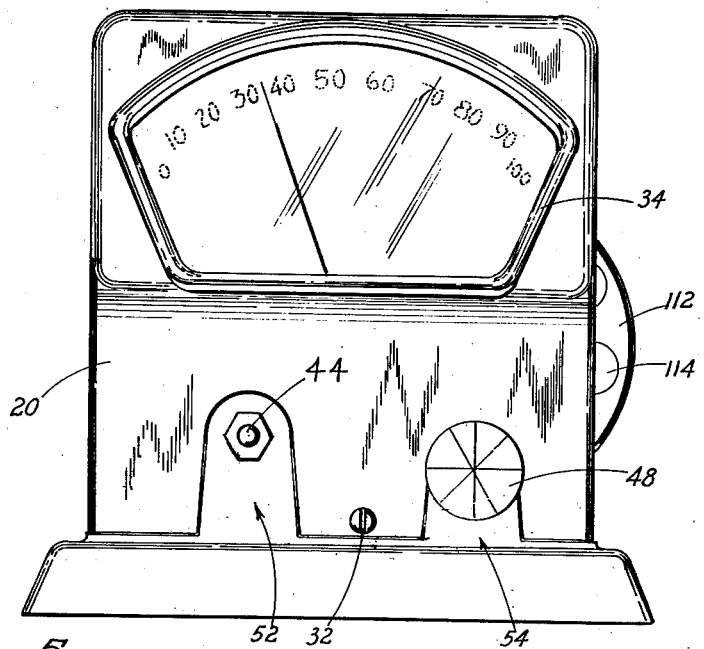
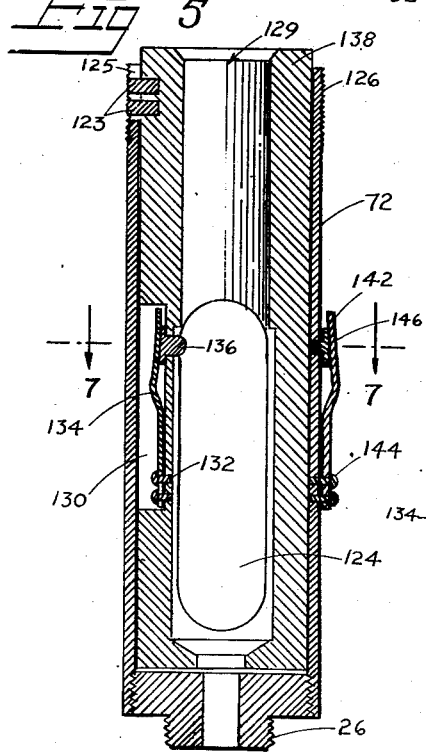
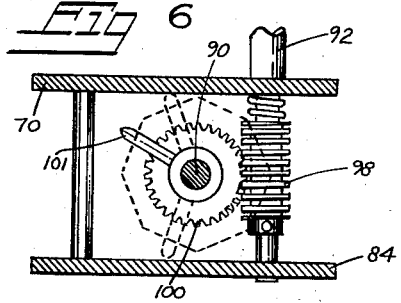
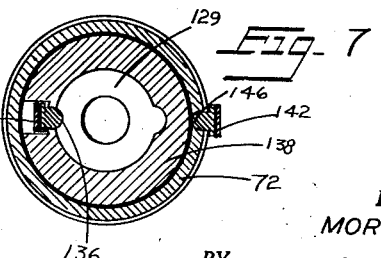
INVENTOR.
MORRIS MASS
BY Irving F. Goodfriend
ATTORNEY Patented Aug. 24, 1948

2,447,985

UNITED STATES PATENT OFFICE 2,447,985

DEVICE FOR DETERMINING PHOTOELECTRICALLY THE CONCENTRATION OF A SOLUTE IN A SOLVENT

Morris Mass, New York, N. Y.

Application June 25, 1945, Serial No. 601,502

12 Claims. (Cl. 250—41.5)

The present invention relates to colorimeters of the type having a photo-electric cell and a source of light, the light energy of which is directed through the test specimen onto the cell.

In application Ser. No. 468,083 filed by me December 7, 1942, and which has issued into Pat. No. 2,421,344, I have illustrated such a colorimeter in which the source of light is mounted in the same compartment of the case in which the cell is carried.

In colorimeters using a photo-electric cell, the cell after a period of use became "fatigued," which resulted in inaccuracies since the instrument would then differ from its original calibration. It was heretofore thought that such fatiguing resulted from the infra-red rays which were projected from the source of light and attempts were made to eliminate cell fatigue by providing an infra-red filter between the light and the cell.

The use of such filters however did not eliminate cell fatigue, the cause of which I have now found to be due primarily to the heating of the cell from any cause and not limited solely to the action of the infra-red rays. These other causes of cell fatigue have up till now escaped the attention of the workers in this field of photoelectrical colorimetry.

I have found that by preventing heating of the photo-electric cell, cell fatigue is eliminated and I accomplish this by arranging the source of light in a housing or compartment which is separate and apart from the housing or compartment in which the cell and the other parts of the colorimeter are mounted. In this manner I prevent the photo-electric cell from being so heated as to affect its operation and thereby eliminate the necessity of using an infrared filter, which at any event did not successfully prevent fatiguing of the cell.

My invention contemplates the provision of a colorimeter, all the operative parts of which, except the light source, are mounted in relation to each other in the case on a supporting base so that, upon arranging the cover of the case on the base, the cell, light valve and the light source, in a separated compartment, are operatively aligned thereby providing a unit that can be inexpensively and readily assembled and yet provide an instrument of satisfactory clinical accuracy. By the construction contemplated there is provided an instrument that is accurate for the clinical operations for which it is intended but which nevertheless may be assembled by comparatively unskilled labor.

It was not heretofore possible to use conventional photo-electric colorimeters to determine the concentrations of certain substances, such as some vitamins, because of the intense light energy required, the adverse effect of which I now can overcome by the construction and arrangement here contemplated, thus making this colorimeter available for that purpose.

These, other and further objects, uses and advantages of the present invention will be clear from the following description and the drawings appended thereto in which Fig. 1 is a partial section through a colorimeter according to my invention and showing the operative elements thereof.

Fig. 2 is a top plan view thereof, partially broken away to show the relative arrangement of certain parts.

Fig. 3 is a partial section through the housing to illustrate the construction of the door for making accessible the filter frame.

Fig. 4 is a front elevation of my colorimeter.

Fig. 5 is a section of the specimen holder.

Fig. 6 is a view on the line 6—6 of Fig. 1.

Fig. 7 is a section on the line 7—7 of Fig. 5.

Fig. 8 is a partial side elevation of my colorimeter.

Referring now to the drawings, the electrical wiring diagram of the instrument is only partially shown as those skilled in the art will understand how the electrical parts are wired together, since they are all conventional.

The housing or case 10 comprises the base 12 and the cover 14, which latter comprises the top 16, end walls 18 and 20, the sides 22 and 24 and which is open at the bottom so that it may be mounted on the floor 26 of the base 12. The ends and sides of the cover 14 rest against the shoulders 28 extending out from the wall 30 around the floor 26 and the cover is removably secured in position on the base as by screws such as the screw 32 in the front wall 20.

The upper part of the front end wall 20 is preferably inclined toward the rear of the case and has mounted therein the meter 34. The meter 34 is electrically wired to the photo-electric cell 36 by means of the leads 38 and 40, which are detachably secured to the meter and cell by conventional nut connections 42.

At the front of the instrument, I arrange a snap switch 44, for opening and closing the circuit for the light source 46 and the knob 48, by means of which the position of the light valve 50 is selected to fix the intensity of light energy projected on the cell through the specimen. The front end 20 is suitably cut away at 52 and 54 to accommodate the switch and knob and the extensions of the base on which they are mounted, when the cover is placed in position.

Extending up from the floor 26, I provide the channel supporting frame 56 to the top plate 58 of which is secured, as by any suitable means as the bolts and nuts 60, a conventional step down transformer and voltage regulator 62, one side of which is connected to the light 46 by leads 64 and the other side of which through the separable plug 66 and leads 68 is connected to the source of power supply.

The separable plug 66 is mounted in the rear end wall 18 and permits the transformer and the source of power to be disconnected when it is desired to remove the cover 14.

Secured to the floor 26, I provide the U-shaped member 70 on which is mounted the sleeve 72 of the specimen holder as by means of the lock nut 74 which engages the threads 76 of the extended member 77, which latter fits into a corresponding opening in the upper leg 77 of the U-shaped member 70.

The photo-electric cell 36 is detachably mounted in fixed position relative to the specimen holder between opposed resilient jaws 78 that are secured as by rivets 79 to the plate 81 integral with the sleeve 72. Thus the relative positions of the cell and specimen holder are aligned when the member 70 is affixed to the base 26.

Extending from the photo-electric cell mounting 81, I provide the arms 80 and 82 which carry the plate 84. The plate 84 is also secured to the bottom 83 of the member 70 as by the spaced spacer arms 85 and collars 87 (the rear spacer and collar not being seen in Fig. 1).

Mounted on the plate 84 as by means of the screws 86, I provide the U-shaped member 88 which carries the light valve 50 and in the upper and lower legs of which is journaled the light valve shaft 90.

It will be recognized that I have thus provided a simple assembled unit by which the positions of the photoelectric cell 36, the light valve 50 and the specimen holder 72 are fixed relatively to each other in the instrument upon mounting the lower leg of the member 70 on the floor 26.

The shaft 92, which at one end extends on the outside of the instrument to have mounted thereon the knob 48 is journaled in the support 94 and the bottom 96 of the U-shaped member 70. Mounted on the shaft 92, I provide the gear 98 which engages the worm gear 100 on the light valve shaft 90 to provide positive rotation of the light valve by corresponding movement of the knob 48 and thus regulate the intensity of light passing through the specimen.

It will now be further recognized that all the operative parts are fixed in position relatively to one another when they are assembled on the floor 26 of the base 12.

In operation, in order to obtain complete opening and closing of the light valve it is unnecessary to rotate it more than 180 degrees and therefore I provide a stop member 102 which engages the U-shaped member 70 and the plate 84 to prevent complete rotation of the light valve 50.

Mounted on the rear end wall 18 on the outside thereof I provide the separate compartment or chamber 102 in which the light 46 is carried.

By thus placing the light, which itself by its incandescence generates heat in addition to projecting the infra-red rays of the spectrum of the light, on the outside of the housing I prevent the fatiguing of the photo-electric cell by eliminating the cause thereof, heretofore unsuspected, in a manner that has completely escaped the attention of workers in this field. In order to focus and concentrate the rays of light onto the photoelectric cell 36, as they pass through the light valve 50 and the test specimen carried in the container 72, I mount in the end 18 of the cover 14 a condensing lens unit 104. It will be noted that upon arranging the cover 14 on the base 12 the lens unit 104 is aligned in proper position with the photo-electric cell, valve and specimen, the positions of all of which are fixed in the unit so that the rays of light are directed through the opening 105 of the plate 84.

In order to make the light 46 accessible for replacement I secure by means of the hinge 106 the top part 108 of the light compartment 102 so that it may be selectively swung away to open and close the compartment.

It may be desired to direct a monochromatic light on the specimen and therefore I rotatably secure on the plate 84 as by means of the screw 110 the filter frame 112 in which is arranged a plurality of different monochromatic filters 114. The desired filter may be positioned between the unit 104 and the specimen at the opening 105 and to readily permit accomplishment of this, I extend the frame partially through the slot 116 in the door 118 mounted in the side 22 of the instrument.

In order to provide a means to make the filter frame 112 accessible so that it may be removed or replaced, I mount the door 118 for removal and secure it against the wall 22 by means of the lock nut 120, the door having a tongue 122 which fits into a corresponding slot in the base 12. This construction permits the door to be removed thereby giving access to the lock nut 118 which can be removed to permit removal of the frame 112, which latter is knurled on its outer perimeter.

The container for holding the test specimen comprises the sleeve 72 and an adapter 138, which latter is removably carried in the sleeve. In order to locate and fix the adapter in the sleeve, the locating pins 123, extending from one side of the adapter are positioned in the slot 125 arranged in the sleeve 72.

The adapter and sleeve are each provided with a pair of opposed aligned windows 124, through which rays of light may pass onto the photoelectric cell 36 through the test specimen held in the compartment 129 of the adapter. The upper part of the sleeve 72 is threaded at 126, which threaded part extends through the top 16 and on which threaded part the knurled collar 128 is fitted to lock the container on the cover 14 when it is placed in position on the base 12.

In order to resiliently hold the specimen test tube in the adapter compartment 129, I secure in the recess 130, as by means of the rivets 132, the spring 134. Mounted on the spring I provide the button 136 which extends a relatively small distance into the compartment 129 to be engaged by a test tube containing the test specimen and so resiliently forced away therefrom and thus tightly hold the test tube in position.

The inner member or adapter 138 of the container is comparatively tightly held in the sleeve 72 by means of the spring member 142 which is mounted on the sleeve 72, as by means of the rivets 144, the button 146 extending through a corresponding opening to engage the inner member or adapter 138.

Inasmuch as there may be a slight quantity of heat generated by the transformer 62, if desired, the louvre openings 148 may be provided in the top 16 of the cover 14.

It will now become apparent that by this construction of the colorimeter, I have prevented heating of the photo-electric cell to eliminate fatigue thereof, the exact cause of which was not heretofore known and which was heretofore incorrectly believed to be caused solely by the impingement on the cell of the infra-red rays in the light spectrum.

It will be further recognized that I have also provided a clinical instrument that can now be used to determine the concentration of substances, such as certain vitamins, which was not heretofore possible with such instruments.

It will further be apparent that I have provided a colorimeter which is extremely accurate but which may be assembled and manufactured with the use of relatively unskilled labor and the parts of which will always be properly fixed in position in relative alignment with each other.

While I have described in specific detail a certain embodiment of my invention, it will be understood that I do not intend to be limited thereto since various modifications may be made therein which will readily occur to those skilled in the art without departing from the scope of the invention.

I claim:

1. In a colorimeter, a photo-electric cell, a specimen container, a light valve for controlling the passage of light rays from a source of light to the photoelectric cell, said cell, container and valve mounted as a unit on a support, a base having a floor, said unit carried in position on said floor, a shaft for operating the light valve and mounted for operation in said unit and accessible on the exterior of the colorimeter, a cover having a top, end and side walls and open at the bottom for mounting the cover on the base to house in the cover the said unit and form a compartment therefor closed on all sides thereof, one end wall of said cover having a light condensing lens in position to be aligned with the elements mounted in said unit upon arranging the cover on the base and a compartment for housing therein a source of light, said compartment mounted on said cover on the exterior thereof adjacent the said lens with the source of light in alignment with the lens and separate from the first mentioned compartment for the said unit formed upon mounting the cover on the base.

2. In a colorimeter, a base, a photo-electric cell, a specimen container, a light valve for controlling the passage of light rays from a source of light to the photoelectric cell mounted in alignment with each other on said base, a cover mounted on said base to form a compartment for housing therein the aligned cell, container and light valve, a second compartment mounted as a separate unit on the cover and a source of light mounted in said second compartment, said second compartment arranged in alignment with the first compartment upon mounting the cover on the base whereby light is directed from said source of light through the valve and container onto the photo-electric cell.

3. The colorimeter of claim 2, a light condensing lens between the first and second compartment and in alignment with the source of light, the valve, container and cell.

4. In a colorimeter, a light valve for controlling the passage of light rays from a source of light mounted on a shaft for rotative positioning of the valve, a specimen container having a sleeve, a photo-electric cell detachably mounted on said sleeve, a support carrying said sleeve, a plate secured to said sleeve, a second support secured to said plate, said second support having the shaft on which the light valve is mounted journalled therein and an operating shaft journalled for rotation in said first and second supports and operatively connected to the first mentioned shaft.

5. In a colorimeter a unit for mounting on the base thereof, said unit comprising a U-shaped member, a specimen container mounted on one leg of said U-shaped member and the other leg thereof mounted on the base of the colorimeter, a photo-electric cell detachably clamped on said container, a plate spaced from said container and carried thereby, a second U-shaped member having its base secured to said plate, a light valve for controlling the passage of light rays from a source of light directed to the photoelectric cell and a shaft carrying said light valve, said shaft journaled in the legs of said second U-shaped member whereby the said light valve is positioned between the plate and the specimen container.

6. The colorimeter of claim 5, said plate having an opening therein and a frame rotatably mounted on said plate and having a plurality of filters for selectively positioning each filter in alignment with the opening.

7. The colorimeter of claim 5, a cover detachably secured to the base and having an opening for alignment with the container upon arranging the cover on the base.

8. The colorimeter of claim 5, a cover detachably secured to the base and having an opening for alignment with the container and a separate compartment having an opening for directing light therethrough and through the opening in the cover onto the photo-electric cell through the light valve and container upon arranging the cover on the base.

9. In a colorimeter, a light valve for controlling the passage of light rays from a source of light and having a plurality of faces and mounted on a shaft for rotative positioning of the valve to control the intensity of light transmitted through the valve, a photoelectric cell, a specimen container positioned between the light valve and the photoelectric cell, a frame carrying the valve, cell and container as a unit in said relative positions, a second shaft for operatively selectively positioning the said light valve to control the intensity of light transmitted therethrough and cooperating gears connecting said second shaft to the light valve shaft.

10. The colorimeter of claim 9, said light valve faces extending from the top to the bottom of the valve and parallel to the light valve shaft.

11. The colorimeter of claim 9 and including a cover open at the bottom and closed at the front and rear, top and sides and a filter frame rotatably secured on the frame and partially extending through one of the sides, said filter frame having a plurality of filters radially spaced about the center of the frame for positioning a selected filter in alignment with the specimen container.

12. In a colorimeter, a compartment closed on all sides and top and bottom for housing therein the operative elements of the colorimeter, a supporting frame, a filter frame, means for detachably securing the filter frame on the supporting frame for rotation thereon, and a door having a slot therein, said door removably mounted on a side of the compartment, said filter frame partially extending through the slot whereby said filter frame may be selectively rotated about its center on the securing means.

MORRIS MASS.

REFERENCES CITED

The following references are of record in the file of this patent:

UNITED STATES PATENTS

| Number | Name | Date |
|---|---|---|
| 2,022,327 | Sheldon | Nov. 26, 1935 |
| 2,084,267 | Hicks | June 15, 1937 |
| 2,157,438 | Sparks | May 9, 1939 |
| 2,193,315 | Evelyn | Mar. 12, 1940 |
| 2,193,437 | Summerson | Mar. 12, 1940 |
| 2,232,169 | Diller | Feb. 18, 1941 |